United States Patent
Sun

(10) Patent No.: US 11,188,134 B2
(45) Date of Patent: Nov. 30, 2021

(54) CONNECTOR AND SECOND ELECTRONIC DEVICE INCLUDING THE CONNECTOR

(71) Applicant: Matrixed Reality Technology Co., Ltd., Wuxi (CN)

(72) Inventor: Pengda Sun, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 0 days.

(21) Appl. No.: 17/256,913

(22) PCT Filed: Jun. 4, 2020

(86) PCT No.: PCT/CN2020/094335
§ 371 (c)(1),
(2) Date: Dec. 29, 2020

(87) PCT Pub. No.: WO2020/253544
PCT Pub. Date: Dec. 24, 2020

(65) Prior Publication Data
US 2021/0249830 A1    Aug. 12, 2021

(30) Foreign Application Priority Data

Jun. 21, 2019  (CN) .......................... 201910542389.5

(51) Int. Cl.
*H01R 25/00*     (2006.01)
*H01R 13/66*     (2006.01)
(Continued)

(52) U.S. Cl.
CPC ............ *G06F 1/266* (2013.01); *G06F 1/3206* (2013.01); *G06F 1/3215* (2013.01);
(Continued)

(58) Field of Classification Search
CPC .. H01R 31/065; H01R 13/6397; H01R 13/66; H01R 13/665; H01R 13/6675;
(Continued)

(56) References Cited

U.S. PATENT DOCUMENTS 9,864,714 B2 * 1/2018 Li ........................... G06F 1/266
10,594,090 B2 * 3/2020 Hodge ................. H02J 13/0005
(Continued)

FOREIGN PATENT DOCUMENTS

CN      204045891 U    12/2014
CN      104915310 A     9/2015
(Continued)

*Primary Examiner* — Renee S Luebke
*Assistant Examiner* — Matthew T Dzierzynski
(74) *Attorney, Agent, or Firm* — Preti Flaherty Beliveau & Pachios LLP

(57) ABSTRACT

The present disclosure provides a connector for coupling a first electronic device and a second electronic device with a power source to enable the power source to provide a current to the first electronic device and the second electronic device, the connector includes: a first connector component configured to be coupled with the first electronic device; a power-supplying connector component configured to be coupled with the power source; a power line configured to couple the second electronic device and the first connector component to the power-supplying connector component; a data line having a first end coupled with the second electronic device, and a second end coupled with the first connector component; and a power-supplying state detection circuit configured to be coupled with the power-supplying connector component and detect whether the power-supplying connector component is coupled with the power source; and a message transmission line having a first end coupled with the power-supplying state detection circuit, and a second end of the message transmission line is coupled with the second electronic device, and the power-supplying state (Continued)

detection circuit is configured to transmit a power source connection message to the second electronic device via the message transmission line when it is detected that the power-supplying connector component is coupled with the power source.

20 Claims, 5 Drawing Sheets

(51) Int. Cl.
*G06F 1/26* (2006.01)
*G06F 1/3215* (2019.01)
*G06F 1/3206* (2019.01)

(52) U.S. Cl.
CPC ........ *H01R 13/6683* (2013.01); *H01R 25/003* (2013.01); *H01R 2201/06* (2013.01); *H01R 2201/16* (2013.01)

(58) Field of Classification Search
CPC ............ H01R 13/6683; H01R 13/6691; H01R 13/70; H01R 27/02; H01R 31/06; H02J 13/0005; H02J 7/00; H02J 7/00036; H02J 7/00045; H04N 5/765; G06F 13/40; G06F 13/4004; G06F 13/4063; G06F 13/4068; G06F 1/32; G06F 1/3203; G06F 1/3206; G06F 1/3215; G06F 1/3234; G06F 1/325; G06F 1/3253; G06F 13/385; G06F 1/266; G06F 2213/0042

See application file for complete search history.

(56) References Cited

U.S. PATENT DOCUMENTS

| | | |
|---|---|---|
| 2014/0225557 A1* | 8/2014 | Park .................... H04M 1/0274 320/107 |
| 2015/0229161 A1 | 8/2015 | Talmola et al. |
| 2015/0253828 A1 | 9/2015 | Li et al. |
| 2016/0291663 A1 | 10/2016 | Sun et al. |
| 2017/0212574 A1 | 7/2017 | Kang et al. |
| 2019/0064900 A1 | 2/2019 | Lee et al. |
| 2019/0173239 A1 | 6/2019 | Hodge |

FOREIGN PATENT DOCUMENTS

| | | |
|---|---|---|
| CN | 107579402 A | 1/2018 |
| CN | 208889997 U | 5/2019 |
| CN | 110137755 A | 8/2019 |
| CN | 209880978 U | 12/2019 |

* cited by examiner

CONNECTOR AND SECOND ELECTRONIC DEVICE INCLUDING THE CONNECTOR

CROSS REFERENCE TO RELATED APPLICATIONS

This patent application claims the priority of the Chinese patent application No. 201910542389.5 filed by the Matrixed Reality (Wuxi) Technology Co., Ltd on Jun. 21, 2019, entitled "Connector and second electronic device including the connector".

FIELD

The present disclosure relates to the field of electronic communication, and more particularly to a connector for connecting a first electronic device to a second electronic device, as well as a second electronic device including the connector.

BACKGROUND

Currently, there are application scenarios where a connector is used to connect two electronic devices to perform data transmission between them. In these application scenarios, data transmission consumes a large amount of power. However, since the number of connector ports of the electronic device is usually limited (usually one), it is impossible to supply power to the electronic device by an external power source. When an electronic device runs out of power, a user has to stop using the device and charge it with its connector port. Therefore, the connector of the related art is inconvenient for a user to use electronic devices.

SUMMARY

In view of the foregoing, the present disclosure provides a connector for connecting a first electronic device to a second electronic device, as well as a second electronic device including the connector. With the connector, by configuring a power-supplying connector component mated with a power source connector component to connect a power source, the power source supplies power to a first electronic device and a second electronic device during data transmission between the first electronic device and the second electronic device can be implemented.

According to an aspect of the present disclosure, a connector for coupling a first electronic device and a second electronic device with a power source to enable the power source to provide a current to the first electronic device and the second electronic device is provided. The first electronic device is able to communicatively connected to the second electronic device via the connector and supply power to the second electronic device, and the connector includes: a first connector component configured to be coupled with the first electronic device; a power-supplying connector component configured to be coupled with the power source; a power line configured to be coupled the second electronic device and the first connector component to the power-supplying connector component to supply power to the second electronic device and the first electronic device by the power source; a data line having a first end coupled with the second electronic device and a second end coupled with the first connector component for data transmission; and a power-supplying state detection circuit configured to be coupled with the power-supplying connector component and detect whether the power-supplying connector component is coupled with the power source; and a message transmission line having a first end coupled with the power-supplying state detection circuit, in which a second end of the message transmission line is coupled with the second electronic device, and the power-supplying state detection circuit is configured to transmit a power source connection message to the second electronic device via the message transmission line when it is detected that the power-supplying connector component is coupled with the power source; or the second end of the message transmission line is coupled with the first connector component, and the power-supplying state detection circuit is configured to: transmit a power source connection message to the first electronic device via the message transmission line when it is detected that the power-supplying connector component is coupled with the power source. The power source connection message is configured to indicate that the power-supplying connector component is coupled with the power source.

Optionally, in an example, the power line may couple the first connector component to the power-supplying connector component via the second electronic device.

Optionally, in an example, the power source connection message may include power source configuration information.

Optionally, in an example, the connector may further include a second connector component coupled with a first end of the data line and configured to couple the data line to the second electronic device; and a third connector component coupled with a second end of the message transmission line and configured to couple the message transmission line to the first electronic device or the second electronic device.

Optionally, in an example, the first connector component and the second connector component may be of a same type.

Optionally, in an example, each of the first connector component and the second connector component may be any one of: a Universal Serial Bus Type-C connector component; a Universal Serial Bus Lighting connector component; a Universal Serial Bus Type-B connector component; a Universal Serial Bus Type-A connector component; and a Mini Universal Serial Bus component.

Optionally, in an example, the first connector component may be a universal serial interface component.

Optionally, in an example, when the second end of the message transmission line is coupled with the second electronic device, the connector may further include: a fourth connector component coupled with the first end of the data line and the second end of the message transmission line, and configured to couple the data line and the message transmission line to the second electronic device.

Optionally, in an example, the data line, the power line, and the message transmission line may be integrated into a connecting cable.

Optionally, in an example, the connecting cable may be formed as a branched connecting cable, the first connector component may be located at a first end of the connecting cable, a second end of the connecting cable may be configured to be coupled with the second electronic device, and the power-supplying connector component may be located at a branch end of the connecting cable.

Optionally, in an example, the connector may further include a housing capable of accommodating the first electronic device, in which the connecting cable is fixed on the housing, and the second connector component extends outward from the housing.

Optionally, in an example, the power-supplying state detection circuit may be arranged within the connecting cable.

Optionally, in an example, the second electronic device may be a wearable augmented reality device or a wearable virtual reality device.

According to another aspect of the present disclosure, a second electronic device comprising the connector as described above is also provided.

Optionally, in an example, the power-supplying state detection circuit may be provided in the second electronic device.

With the connector of the present disclosure, by providing the power-supplying connector component mated with the power source connector component, and using the message transmission line to transmit the power source connection message to the first electronic device or the second electronic device, power supplying to the first electronic device and the second electronic device by the power source during data transmission between the first electronic device and the second electronic device can be implemented, thereby, the power endurance of the first electronic device and the second electronic device can be improved to facilitate user usage.

With the connector of the present disclosure, by coupling the power line to the first connector component via the second electronic device, the power line can cause the power source to be coupled with the first electronic device via the second electronic device.

With the connector of the present disclosure, by transmitting the power source configuration message to the first electronic device or the second electronic device, so that when the power source connection message is transmitted to the first electronic device, the first electronic device may stop supplying power to the second electronic device when the power source configuration information indicates that the power source has the ability to supply power to the second electronic device, and when the power source connection message is transmitted to the second electronic device, the second electronic device may transmit power-supplying-stop message to the first electronic device when the power source configuration information indicates that the power source has the ability to supply power to the second electronic device. This can prevent the second electronic device from failing to work properly after the first electronic device stops supplying power to the second electronic device.

With the connector of the present disclosure, by providing the second connector interface at an end of the data line connected with the second electronic device, and the third connector interface at an end of the data line connected with the second electronic device, the connector can be connected to the second electronic device in a pluggable manner to facilitate user usage.

With the connector of the present disclosure, by arranging the power-supplying state detection circuit adjacent to the first connector component, a user can conveniently move while using the first electronic device and the second electronic device.

With the connector of the present disclosure, by integrating the data line, the power line, and the message transmission line into the connecting cable, inconvenience caused by the use of multiple connecting cables can be avoided, thereby, a user can conveniently use the connector to connect the first electronic device, the second electronic device, and the power source to each other.

BRIEF DESCRIPTION OF THE DRAWINGS

By referring to the following appended drawings, a further understanding of the nature and advantages of the present disclosure may be achieved. In the appended drawings, similar components or features may have the same reference label. The appended drawings are used to provide a further understanding of the embodiments of the present invention and constitute a part of the specification, and used to, together with the following detailed description, explain the embodiments of the present disclosure, but do not constitute a limitation to the embodiments of the present disclosure.

DESCRIPTION OF REFERENCE LABEL

Figure 1A:
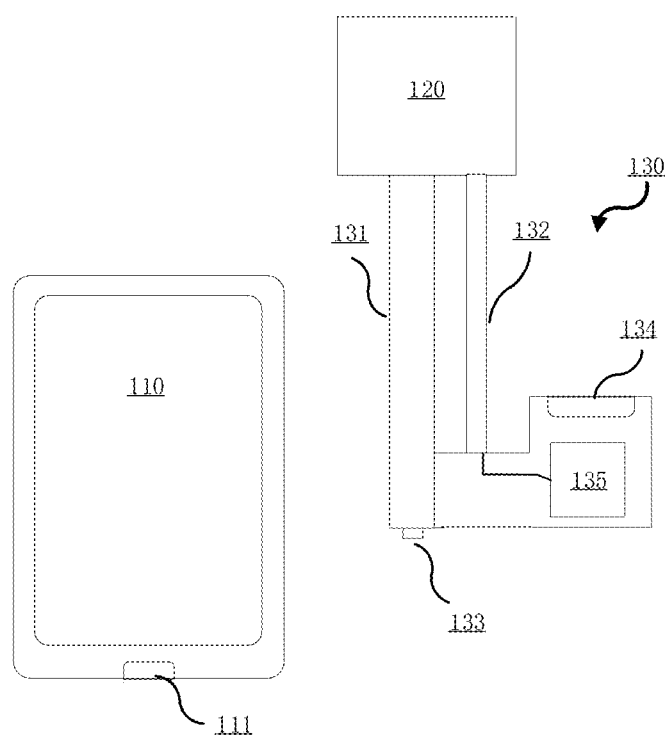
FIG. 1A is a schematic diagram of a connector, a first electronic device, and a second electronic device according to an embodiment of the present disclosure, in which the connector is applicable to the first electronic device and the second electronic device.

110: first electronic device
111: first device-end connector component
120: second electronic device
130: connector
131: data line
132: message transmission line
133: first connector component
134: power-supplying connector component
135: power-supplying state detection circuit
136a/136b/136c/136d/136e: power line
140: power source
210: first electronic device
211: first device-end connector component
220: second electronic device
221: second device-end connector component
222: third device-end connector component
230: connector
231: data line
232: message transmission line
233: first connector component
234: power-supplying connector component
235: power-supplying state detection circuit
236: second connector component
237: third connector component
310: first electronic device
311: first device-end connector component
320: second electronic device
321: second adaptation circuit
330: connector
331: data line
332: message transmission line
333: first connector component
334: power-supplying connector component
335: power-supplying state detection circuit -continued

DESCRIPTION OF REFERENCE LABEL

410: first adaptation circuit
420: second adaptation circuit
430: power source
440: power-supplying connector component
450: power-supplying state detection circuit

DETAILED DESCRIPTION

The subject described herein will be discussed below with reference to example embodiments. It should be understood that the discussion of these embodiments is only to enable those skilled in the art to better understand and implement the subject described herein, and is not to limit the scope, applicability or examples set forth in the claims. The functions and arrangements of the discussed elements may be changed without departing from the scope of the present disclosure. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions can be included below, either explicit or implicit. The definition of a term is consistent throughout the description, unless clearly indicated in the context.

Herein, the term "couple" refers to direct mechanical connection, communication or electrical connection between two components, or indirect mechanical connection, communication or electrical connection through intermediate components. The term "electrical connection" refers to that two components can electrically communicate with each other for data/information exchange. Likewise, the electrical connection may refer to a direct electrical connection between two components, or an indirect electrical connection through intermediate components. The electrical connection may be implemented in a wired manner or a wireless manner.

A connector and a second electronic device including the connector of the present disclosure are described in conjunction with the appended drawings.

Figure 1B:
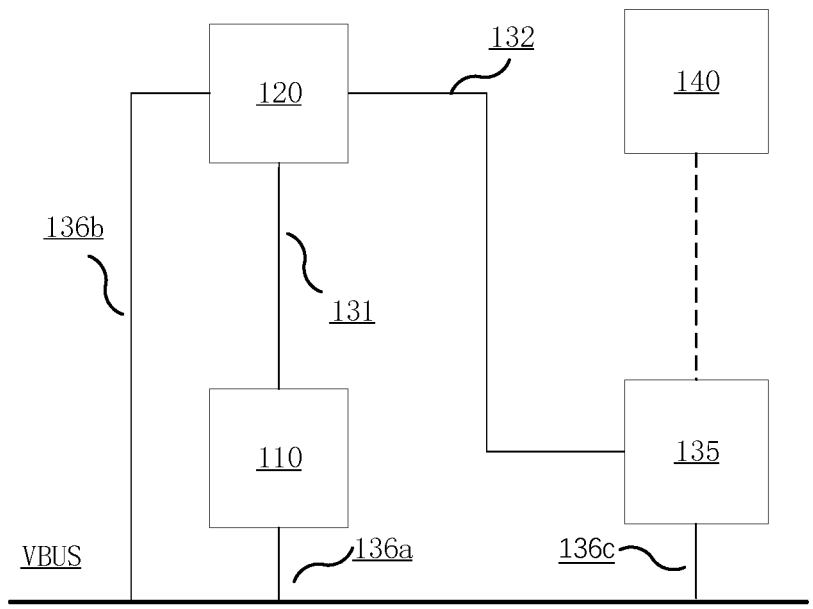
FIG. 1B is a schematic diagram of an example of a various circuit connection relationship when the connector shown in FIG. 1A connects the first electronic device to the second electronic device.
Figure 1C:
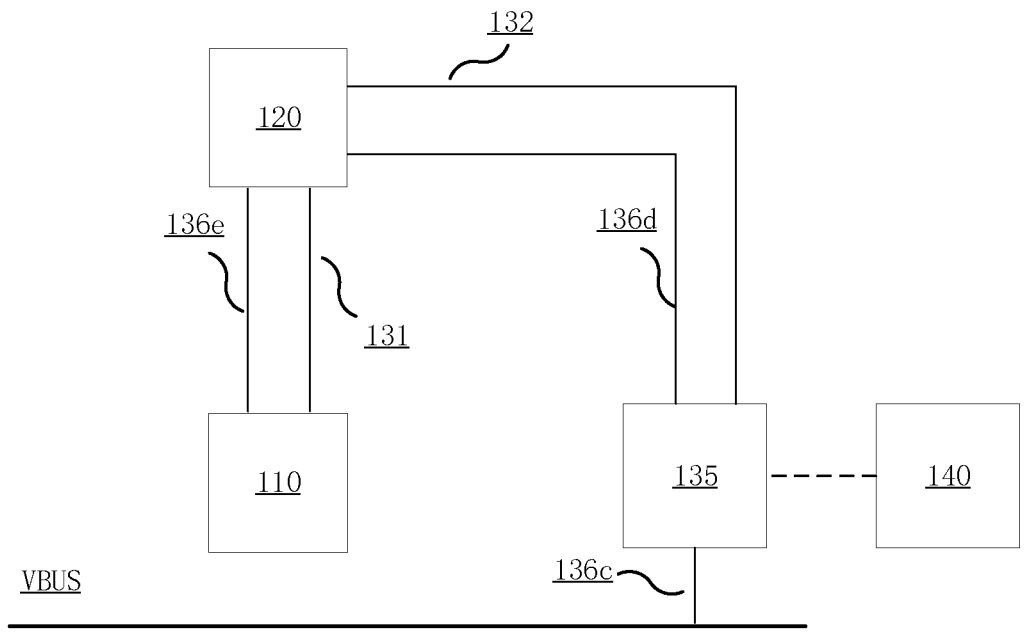
FIG. 1C is a schematic diagram of another example of a various circuit connection relationship when the connector shown in FIG. 1A connects the first electronic device to the second electronic device.

FIG. 1A is a schematic diagram of a connector, a first electronic device, and a second electronic device according to an embodiment of the present disclosure, in which the connector is applicable to the first electronic device and the second electronic device. FIG. 1B is a schematic diagram of a various circuit connection relationship when the connector shown in FIG. 1A connects the first electronic device to the second electronic device. FIG. 1C is a schematic diagram of another example of a various circuit connection relationship when the connector shown in FIG. 1A connects the first electronic device to the second electronic device. Among them, a connector component is omitted in FIGS. 1B and 1C.

As shown in FIG. 1A, the connector 130 is used to cause the first electronic device 110 to be coupled with the second electronic device 120. The first electronic device 110 can use its own power source to power the second electronic device 120. The second electronic device itself may not have a power source or may have a power source. The first electronic device 110 may be, e.g., a smart phone, a tablet computer, a desktop computer, or other devices. The second electronic device 120 may be, e.g., a wearable virtual reality device, such as Virtual Reality (VR) glasses, a wearable augmented reality device, such as Augmented Reality (AR) glasses, a smart bracelet, a smart phone, a display device, etc. Generally, the first electronic device 110 is the master device and the second electronic device 120 is the slave device, and the master device can communicate data (a video, an audio file, a picture, etc.) to the slave device for various operations of the slave device (such as display operation).

The first electronic device 110 may have a first device-end connector component 111 and a first adaptation circuit (not shown in the drawings) coupled with the first device-end connector component 111. The second electronic device 120 may have a second adaptation circuit (not shown in the drawings). In embodiments of the present disclosure, the adaptation circuit is coupled with the connector component or a corresponding connecting cable. When a connector component of a connector end is coupled with a connector component of a device end, a data line or message transmission line of the connecting cable is coupled with a data transmission port or message transmission port of the adaptation circuit, and signals or data are transmitted through the data line and the message transmission line. The adaptation circuit may also cause a power line of the connector to be coupled with a power source port of the electronic device to supply power to the electronic device. The adaptation circuit can also perform the Power Deliver (PD) protocol. The adaptation circuit may also detect and determine an insertion direction of the connector component, and configure the data transmission port according to the insertion direction. For example, the device-end connector component and the connector-end connector component may be Type-C, Lightning and other types of plugs that can be plugged in front and back, in which cases, the adaptation circuit may configure the data port of the connector socket according to the insertion direction of the connector interface. The adaptation circuit is an adaptation circuit of the corresponding first electronic device and the second electronic device. For example, for a smart phone, its adaptation circuit may be a part of a main control circuit of the phone. For AR/AR circuit, the adaptation circuit may be a part of its internally configured circuit.

As an example, the first electronic device 110 may be a smart phone, and the second electronic device 120 may be VR/AR glasses. When a smart phone is coupled with VR/AR glasses by a connecting cable (such as a USB cable), the smart phone may transfer video, audio file and other data to the VR/AR glasses through a data line of the connecting cable, thereby displaying VR/AR effects on the VR/AR glasses. Meanwhile, if the VR/AR glasses do not have a power source, the smart phone may supply power to the VR/AR glasses through a power line of the connecting cable. Alternatively, even if the AR/AR glasses have a power source, since data display and data processing consume a large amount of power, the first electronic device may also be used to supplying power to the VR/AR glasses. In this case, data transmission using the data display and data processing operations of the second electronic device 120 consume a large amount of power, and when a connecting cable of the related art is used, the power source cannot be used for supplying power. When the power is depleted, usage must be suspended, and the first electronic device 110 and/or the second electronic device 120 must be charged before resuming the usage.

However, with the connector 130 shown in FIG. 1A, power supplying with a power source during data transmission between the first electronic device 110 and the second electronic device 120 can be implemented. The connector 130 includes a data line 131, a message transmission line 132, a first connector component 133, a power-supplying connector component 134, and a power-supplying state detection circuit 135 coupled with the power-supplying connector component 134. The power-supplying connector component 134 is mated with a power source connector component to be coupled with the power source.

The connector 130 also includes a power line (not shown in FIG. 1A). The power line can be coupled with a power source port of the first connector component, a power source port of the second electronic device, and a power source port of the power-supplying connector component, to enable the first connector component and the second electronic device to be coupled with the power-supplying connector component. For example, a power source port of a connector component, a power source port of the second electronic device, and a power source port of the power-supplying connector component can be coupled to the power bus (VBUS).

As shown in FIG. 1B, in an example, the power line may include power lines 136a, 136b, and 136c, coupling the first electronic device 110, the second electronic device 120, and the power-supplying state detection circuit 135 to the VBUS, respectively. The power source port of the power-supplying connector component (not shown in FIG. 1B) may be coupled with a power source port of power-supplying state detection circuit 135, or may be coupled to the VBUS. Therefore, the power line can couple the first electronic device 110 and the second electronic device 120 with the power-supplying connector component. When the power-supplying connector component is coupled with the power source 140, the power source 140 can be coupled with the first electronic device 110 and the second electronic device 120, so that the power source 140 can be used to supply power to both of them.

In another example, the power line may include power lines 136c, 136d, and 136e as shown in FIG. 1C. The power line 136c couples the power-supplying state detection circuit 135 with the VBUS, the power line 136d is coupled with the power-supplying state detection circuit 135 and the power source port of the second electronic device 120, and the power line 136e couples the first electronic device with the power source port of the second electronic device 120. The power source port of the power-supplying connector component (not shown in FIG. 1C) may be coupled with the power source port of power-supplying state detection circuit 135, or may be coupled with the VBUS. Thus, the power line can couple the first electronic device 110 with the power-supplying connector component via the second electronic device 120, so that the power line can couple the first electronic device with the power-supplying connector component via the second electronic device. When the power-supplying connector component is coupled to the power source 140, the power source 140 can be coupled with the first electronic device 110 and the second electronic device 120.

In addition, the power line may also be coupled with the power source port of the power-supplying connector component without via the power-supplying state detection circuit, or may be coupled with the power source port of the power-supplying connector component through the VBUS.

The first electronic device 110 may have a first device-end connector component 111. The first connector component 133 is mated with the first device-end connector component 111 of the first electronic device 110 for coupling with the first electronic device 110. In an example, the first device-end connector component 111 may be a connector port, and the first connector component 133 may be a connector plug mated with the connector port, thus the first connector component 133 can be coupled with the first electronic device 110 when the first connector component 133 is inserted into the first device-end connector component 111.

The data line 131 has a first end which is coupled with a data transmission port of the second electronic device 120, and a second end which is coupled with the data transmission port of the first connector component 133. As shown in FIGS. 1B and 1C, when the first connector component 133 is coupled with the first device-end connector component 111, the first electronic device 110 is communicatively connected to the second electronic device 120 via the data line 131, thereby data can be transmitted between the first electronic device 110 and the second electronic device 120 via the data line 131. Meanwhile, since the power line is coupled with the power source port of the second electronic device and the power source port of the first connector component, the first electronic device may configure its own power source state as a power-supplying state to supply power to the second electronic device via the power line.

The power-supplying connector component 134 may be mated with the power source connector component. In an example, the power source connector component may be a connector plug, and the power-supplying connector component 134 may be a connector port mated with the power source connector component. When the power source connector component is inserted into the power-supplying connector component 134, the power source can be coupled with the third connector component. The power-supplying connector component may be, e.g., a Universal Serial Bus Type-C (USB Type-C) connector plug, a Universal Serial Bus Lighting connector plug, a Universal Serial Bus Type-B (USB Type-B or Micro USB-B) connector plug, a Universal Serial Bus Type-A (USB Type-A or Micro USB-A) connector plug, mini Universal Serial Bus (Mini USB) plug, etc.

The power-supplying state detection circuit 135 is coupled with the power-supplying connector component 134. The power-supplying state detection circuit 135 is configured to detect whether the power-supplying connector component 134 is coupled with the power source. In an example, the power-supplying connector component 134 may be a connector port, and the power source connector component may be a connector plug. In this example, the power-supplying state detection circuit 135 can detect whether the power source connector component is inserted into the power power-supplying connector component 134 in the form of a port, thereby detecting whether the power source is coupled with the power-supplying connector component. The power-supplying state detection circuit 135 may also be configured to obtain power source configuration information of the power source, e.g., parameters such as voltages and currents, etc. The power source configuration information can reflect the power-supplying capability of the power source. The power-supplying state detection circuit 135 may also be configured to detect an insertion direction of the power source connector component, and configure a data transmission port of the power-supplying connector component 134 according to the insertion direction. As shown in FIGS. 1B and 1C, when the power source connector component is coupled with the power-supplying connector component, the power source 140 is coupled with the power-supplying state detection circuit 135.

A first end of the message transmission line 132 is coupled with the power-supplying state detection circuit 135. As shown in FIG. 1A, a second end of the message transmission line 132 may be coupled with the second electronic device 120. Thus, when the power-supplying state detection circuit 135 detects that the power source is coupled with the power-supplying connector component 134 for supplying power, a power source connection message may be transmitted to the second electronic device 120 via the message transmission line 132. In this example, the power source connection message is used to inform the second electronic device 120 that the power-supplying connector component 134 is coupled with the power source.

Upon receiving the power source connection message, the second electronic device 120 may transmit a power-supplying-stop message to the first electronic device 110 to inform the first electronic device to stop supplying power to the second electronic device. Upon receiving the power-supplying-stop message, the first electronic device 110 stops supplying power to the second electronic device. Then, the first electronic device 110 may convert its internal power source state into a power-receiving state to use the power source to supply power to itself. The first electronic device 110 may perform the Power Swap process in the PD protocol to set the power source state as the power-receiving state, so that the power source can supply power to the first electronic device and the second electronic device.

For example, in the case of a smart phone and AR/VR glasses, after the first connector component is coupled with a first device-end connector component of the smart phone, if the power-supplying connector component is not connected to the power source 140, a first adaptation circuit inside the smart phone can cause the smart phone to enter a display data output mode to output a display data to the AR/VR glasses via the data line. Meanwhile, the PD protocol may be performed between the first adaptation circuit and the second adaptation circuit of the AR/VR glasses to make the smart phone to convert the power state to the power-supplying state, so that power can be supplied to the AR/VR glasses via the power line. After the power-supplying connector component is connected to the power source 140, the second adaptation circuit of the AR/VR glasses informs the smart phone to stop supplying power to the AR/VR glasses after receiving the power source connection message.

In another example, the second end of the message transmission line 132 may be coupled with the first connector component 133. In this example, the first connector component 133 may also have a message transmission port in addition to the data transmission port and the power source port, and the message transmission port is used to be coupled with the message transmission line. Thus, when the first connector component 133 is coupled with the first device-end connector component 111, the message transmission line 132 may be coupled to the first electronic device 110. In this example, when the power-supplying state detection circuit 135 detects that the power-supplying connector component 134 is coupled with the power source 140, a power source connection message may be transmitted to the first electronic device 110 via the message transmission line 132. Upon receiving the power source connection message, the first electronic device 110 can stop supplying power to the second electronic device 120. After stopping supplying power to the second electronic device 120, the first electronic device 110 can convert its internal power source state into a power-receiving state to use the power source to supply power to itself.

In an example, the power source connection message may include power source configuration information. The second electronic device 120 may determine whether to transmit a power-supplying-stop message to the first electronic device 110 based on the power source configuration message. When the second electronic device 120 receives the power source configuration information, it may be determined whether the power source has the ability to supply power to the second electronic device according to the power source configuration information. For example, it may be determined whether a voltage, a current, etc. provided by the power source can meet the power requirements of the second electronic device. Then, the second electronic device 120 may transmit a power-supplying-stop message to the first electronic device 110 when the power source has the ability to supply power to the second electronic device, so as to stop the first electronic device from supplying power to the second electronic device. When the second end of the message transmission line is coupled to the first device-end connector component 111, the first electronic device 110 may also determine whether to stop supplying power to the second electronic device 120 based on the power source configuration information, and may also configure the power source state based on the power source configuration information.

After the first electronic device stops supplying power to the second electronic device, since the power source port of the second electronic device is connected to the power source via the power source port of the power-supplying connector component, the second electronic device may receive power from the power source and continue to work. After the first electronic device stops supplying power to the second electronic device and receives power from the power source, the second electronic device can be restarted. After the restart, a data transmission request is again transmitted to the first adaptation circuit of the first electronic device via the data line, so that the first adaptation circuit of the first electronic device configures the data output mode.

Thus, the power source 140 may be used to supply power to the second electronic device during normal data transmission between the first electronic device and the second electronic device, so that endurance of the first electronic device and the second electronic device can be improved.

Figure 2:
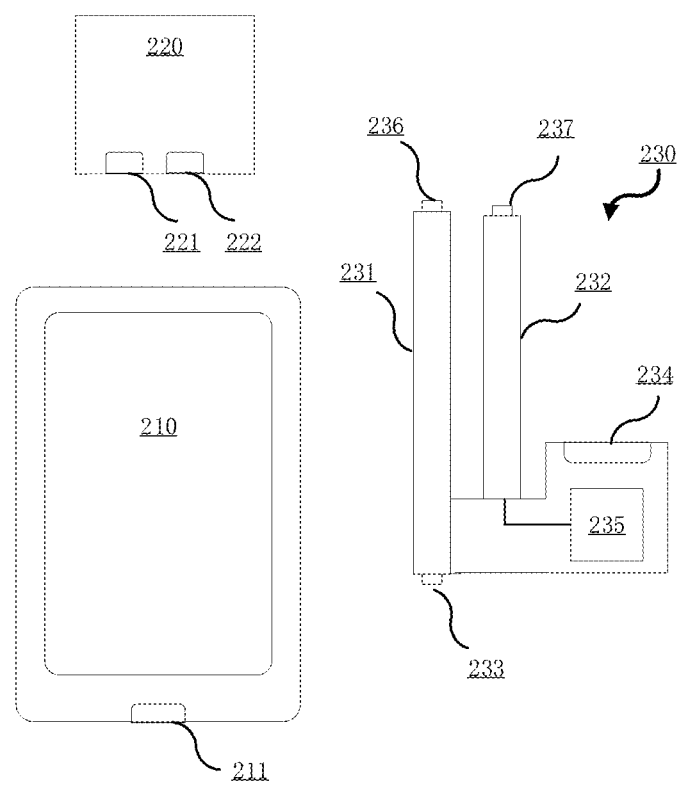
FIG. 2 is a schematic diagram of a connector, a first electronic device, and a second electronic device according to another embodiment of the present disclosure, in which the connector is applicable to the first electronic device and the second electronic device.

FIG. 2 is a schematic diagram of a connector, a first electronic device, and a second electronic device according to another embodiment of the present disclosure, in which the connector is applicable to the first electronic device and the second electronic device. In the example shown in FIG. 2, another end of a message transmission line 232 is used to be coupled with a second electronic device 220.

A power line is not shown in FIG. 2, and the power line may couple a power source port of a first connector component 233 and a power source port of a second connector component 236 with a power source port of a power-supplying connector component 234 in any manner. For example, the power line may be respectively coupled with the power source port of the first connector component 233, the power source port of the second connector component 236, and the power source port of the power-supplying connector component 234, to couple the three to a VBUS. The power line may also couple the power source port of the second connector component 236 and the power source port of the power-supplying connector component 234 to the VBUS, and couple the power source port of the second connector component 236 to the power source port of the first connector component 233.

As shown in FIG. 2, the second electronic device 220 has a second device-end connector component 221 and a third device-end connector component 222, and the connector 230 has a second connector component 236 and a third connector component 237. The second connector component 236 and the third connector component 237 are mated with the second device-end connector component 221 and the third device-end connector component 222, respectively. The second connector component 236 is coupled with an end of a data line that is coupled with the second electronic device 220, to couple the data line 231 with the second electronic device 220. The third connector component 237 is coupled with the end of the message transmission line that is coupled with the second electronic device 220, to couple the message transmission line 232 to the second electronic device 220.

When the first connector component 233 is coupled with a first device connector component 211 of the first electronic device, and the second connector component 236 and the third connector component 237 are respectively coupled with the second device-end connector component 221 and the third device-end connector component 222, the connector 230 can enable data transmission between the first electronic device and the second electronic device. When the power source is coupled with the power-supplying connector component 234, the power-supplying state detection circuit 235 may transmit a power source connection message to the second electronic device 220 via the message transmission line 232. Upon receiving the power source connection message, the second electronic device 220 transmits a power-supplying-stop message to the first electronic device 210. After receiving the power-supplying-stop message, the first electronic device 210 stops supplying power to the second electronic device 220, and converts its own power source state to a power-receiving state, so that the power source can supply power to the first electronic device 210 and the second electronic device 220.

In another example, as an alternative to the second connector component 236 and the third connector component 237, the connector 230 may have a fourth connector component. The fourth connector component may have a data transmission port which is coupled with an end of the data line that is coupled with the second electronic device, and a message transmission port which is coupled with an end of the message transmission line that is coupled with the second electronic device. In this example, the second electronic device may have a device-end connector component that is mated with the fourth connector component, and when the fourth connector component is coupled with the device-end connector component, the data line and the message transmission line can be coupled with the second electronic device.

The data line, power line, and message transmission line may be integrated into a connecting cable. The data line and the power line may be integrated into a first connecting cable, and the message transmission line may be integrated in a second connecting cable. In this example, the first connecting cable has a first end which can be provided with a second connector component and a second end which can be provided with a first connector component. The second connecting cable has a first end which can be provided with a third connector component and a second end which can be coupled with the state detection circuit.

The first connecting cable and the second connecting cable may be further integrated in a same one connecting cable to facilitate user usage. The first connector component may be provided at a first end of the same one connecting cable, and the fourth connector component may be provided at a second end of the same one connecting cable.

The connecting cable may be formed as a branched connecting cable, which has a first end which can be coupled with the first connector component, and a second end which can be coupled with the second electronic device or the connector component for being coupled with the second electronic device (e.g., the second connector component, the third connector component, and the fourth connector component). The power-supplying connector component for coupling the power source may be provided at a branch end. In another example, the connector may not be provided with a protruding branch end, e.g., a power-supplying connector component may be provided at intersection of the data line and the message transmission line.

In the example of integrating the power line and the data line into the first connecting cable, the first connecting cable may be any Universal Serial Bus that can implement data transmission function and power transmission function, e.g., may be a Universal Serial Bus Type-C (USB Type-C) cable, a Universal Serial Bus Lighting cable, a Universal Serial Bus Type-B (USB Type-B or Micro USB-B) cable, a Universal Serial Bus Type-A (USB Type-A or Micro USB-A) cable, and a mini Universal Serial Bus (Mini USB) cable, etc.

The first connector component may be a universal serial interface component. For example, the first connector interface may be a Universal Serial Bus Type-C (USB Type-C) connector interface, a Universal Serial Bus Lighting connector interface, a Universal Serial Bus Type-B (USB Type-B or Micro USB-B) connector interface, a Universal Serial Bus Type-A (USB Type-A or Micro USB-A) connector interface, and a mini Universal Serial Bus (Mini USB) interface, etc. In an example, the second connector component and the first connector component may be of the same type.

In an example, the connector of the present disclosure may further include a housing capable of accommodating the first electronic device, the connecting cable may be fixed on the housing, and the second connector component and the third connector component (or the fourth connector component) may extend outward from the housing. At this point, the power-supplying state detection circuit may be arranged within the connecting cable, and may also be arranged within the housing. In this example, the power-supplying connector component may be provided adjacent to a position where the power-supplying state detection circuit is provided. In an example, the first connector component may be provided at a position on the housing that is adjacent to a device end connector of the first electronic device, so as to facilitate the first connector component coupling with the first electronic device when the first electronic device is provided inside the housing. The third connector component may extend outward from the housing, or may be provided on the housing, e.g., may be provided on a side of the housing.

The power-supplying state detection circuit may be arranged adjacent to the first connector component. Since the user may need to hold or move the first electronic device or the second electronic device when using the first electronic device and the second electronic device, by arranging the power-supplying state detection circuit adjacent to the first connector interface, a larger or heavier part of the connector is adjacent to the first electronic device, which facilitates the user moving or holding, and facilitates the user inserting the connector into or pulling the connector out from the first electronic device. In an example, the power-supplying state detection circuit may be arranged within the connecting cable.

Figure 3:
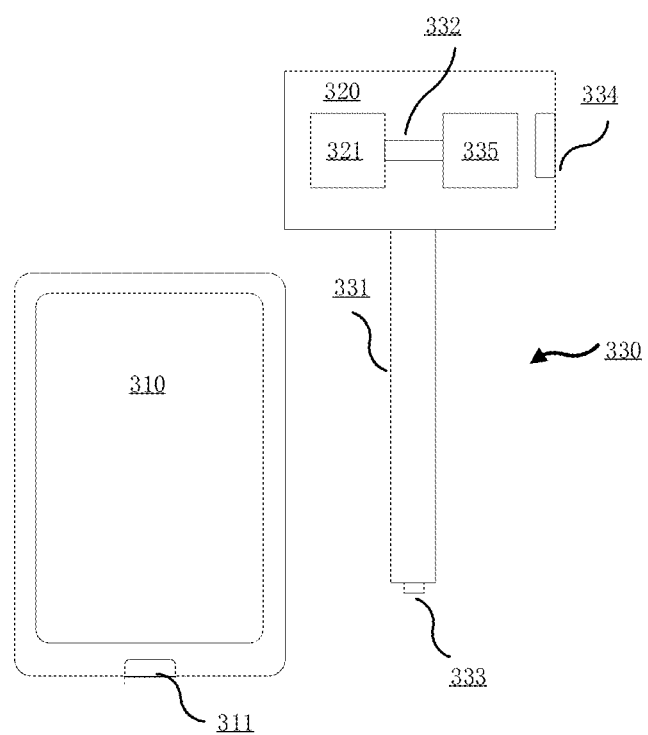
FIG. 3 is a schematic diagram of a second electronic device and a first electronic device, which can be coupled with the second electronic device according to an embodiment of the present disclosure.

In an example, the connector described in embodiments of the present disclosure may act as a component of the second electronic device. FIG. 3 is a schematic diagram of a second electronic device and a first electronic device, which can be coupled with the second electronic device according to an embodiment of the present disclosure.

As shown in FIG. 3, when a connector 330 acts as a component of a second electronic device 320, a power-supplying state detection circuit 335 may be provided in the second electronic device 320, and coupled with a second adaptation circuit 321 of the second electronic device 320 via a message transmission line 332. A power-supplying connector component 334 may be provided on the second electronic device 320, and when a power source is coupled with the power-supplying connector component 334, the power-supplying state detection circuit 335 transmits a power source connection message to the second adaptation circuit 321 via the message transmission line 332. A data line 331 has a first end which can be coupled with the second adaptation circuit 321 and a second end which can be coupled with a first connector component 333. A power line (not shown) may be coupled with a VBUS, and may be coupled with a power source port of a first connector component, a power source port of a second adaptation circuit, and a power source port of a power-supplying connector component. At least a part of the power line and the data line 331 may be integrated into a connecting cable, the first connector component may be provided on an end of the connecting cable. The data line 331 may be coupled with the data transmission port of a first connector component 333, and the power line may be coupled with the power source port of the first connector component. When the first connector component is coupled with the first device-end connector component, the second electronic device is enabled to communicatively connect with the first electronic device via a data line, and the first electronic device is coupled with the power-supplying connector component via a power line.

Figure 4:
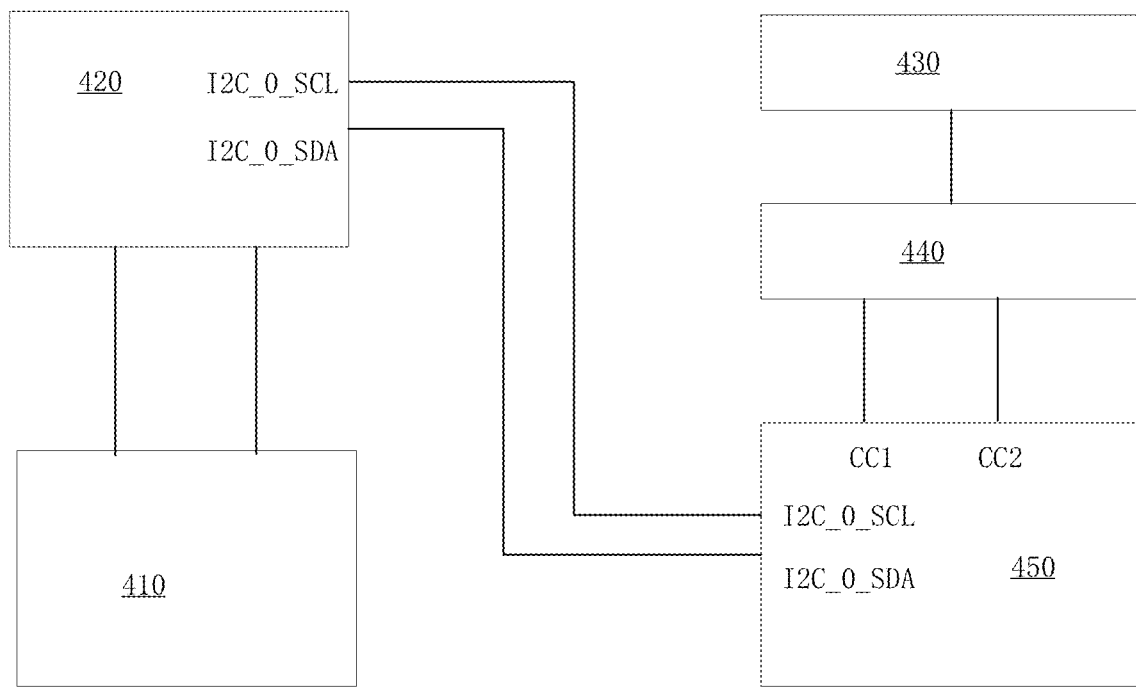
FIG. 4 is a schematic diagram of circuit connection relationship when a connector according to another embodiment of the present disclosure connects a first electronic device to a second electronic device.

FIG. 4 is a schematic diagram of circuit connection relationship when a connector according to another embodiment of the present disclosure connects a first electronic device to a second electronic device. In FIG. 4, as an example, a power-supplying state detection circuit 450 is implemented based on a CCG2 chip, and a second adaptation circuit 420 is implemented based on a CCG3 chip. The above-mentioned chips are only listed to illustrate the implementation examples of the connector in detail, and the embodiments of the present disclosure are not limited thereto, and may be implemented by any electronic device capable of implementing the circuit functions of the present disclosure. The power-supplying state detection circuit and the second adaptation circuit may also be implemented based on any electronic device capable of implementing the Power Delivery (PD) protocol and data transmission function. In addition, FIG. 4 only illustrates the connection relationship for explaining the solution of the present disclosure, and other devices or connection relationships are omitted.

As shown in FIG. 4, when a power source connector component (not shown in FIG. 4) is inserted into a power-supplying connector component 440, a power source 430 is connected to the power-supplying connector component 440. A data port of the power-supplying connector component 440 is connected to a CC line of the CCG2 in the power-supplying state detection circuit 450 which is implemented based on the chip, to communicate a power connection message to the CCG2. A I2C data port of the power-supplying state detection circuit 450 is coupled to an I2C data port of a second adaptation circuit 420 via a data line. Thus, the power-supplying state detection circuit 450 can transmit a power source connection message to the second adaptation circuit 420 via a message transmission line.

It should be noted that although the power-supplying state detection circuit and the second adaptation circuit shown in FIG. 4 communicate power source connection messages through I2C communication, those skilled in the art may also communicate the power source connection message through other data communication protocols or formats by rationally configuring the power-supplying state detection circuit and the second adaptation circuit. For example, the power source connection message may also be communicated based on the USB2.0 protocol through rationally configuring the circuits.

The embodiments of the connector and the method for supplying power with the connector according to the present disclosure have been described above with reference to FIGS. 1A to 4. The details mentioned in the above description of the method embodiments are also applicable to the embodiments of the apparatus of the present disclosure. Respective embodiments in this description are described in a progressive manner, and the same or similar parts among the various embodiments are referenced to each other.

The foregoing describes specific embodiments of the description. Other embodiments are within the scope of the appended claims. In some cases, the actions or steps set forth in the claims may be performed in a different order than that in the embodiments and still achieve desired results. In addition, the processes described in the appended drawings do not necessarily require the illustrated specific order or sequential order to achieve the desired result. In certain implementations, multitasking and parallel processing are also possible or may be advantageous.

Not all steps and units in the processes and system structure diagrams described above are necessary, and some steps or units may be omitted according to actual needs. The performance order of each step is not fixed, and may be determined as needed. The apparatus structure described in the foregoing embodiments may be a physical structure or a logical structure, that is, some units may be implemented by a same physical entity, or some units may be implemented by multiple physical entities separately, or may be jointly implemented by some parts in multiple independent devices.

The term "exemplary" used throughout the description means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the appended drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A connector for coupling a first electronic device and a second electronic device with a power source to enable the power source to provide a current to the first electronic device and the second electronic device, wherein the first electronic device is able to communicatively be connected to the second electronic device via the connector and supply power to the second electronic device, and the connector comprises:
   a first connector component configured to be coupled with the first electronic device;
   a power-supplying connector component configured to be coupled with the power source;
   a power line configured to couple the second electronic device and the first connector component with the power-supplying connector component to supply power to the second electronic device and the first electronic device by the power source;
   a data line having a first end coupled with the second electronic device and a second end coupled with the first connector component for data transmission; and
   a power-supplying state detection circuit configured to be coupled with the power-supplying connector component and detect whether the power-supplying connector component is coupled with the power source; and
   a message transmission line having a first end coupled with the power-supplying state detection circuit,
   wherein a second end of the message transmission line is coupled with the second electronic device, and the power-supplying state detection circuit is configured to transmit a power source connection message to the second electronic device via the message transmission line when it is detected that the power-supplying connector component is coupled with the power source, to enable the second electronic device to transmit a power-supplying-stop message to the first electronic device, and the power-supplying-stop message is configured to inform the first electronic device to stop supplying power to the second electronic device; or
   the second end of the message transmission line is coupled with the first connector component, and the power-supplying state detection circuit is configured to transmit a power source connection message to the first electronic device via the message transmission line when it is detected that the power-supplying connector component is coupled with the power source, to inform the first electronic device to stop supplying power to the second electronic device,
   wherein the power source connection message is configured to indicate that the power-supplying connector component is coupled with the power source.

2. The connector of claim 1, wherein the power line couples the first connector component with the power-supplying connector component via the second electronic device.

3. The connector of claim 2, wherein the data line, the power line, and the message transmission line are integrated into a connecting cable.

4. The connector of claim 2, wherein the second electronic device is a wearable augmented reality device or a wearable virtual reality device.

5. The connector of claim 1, wherein the power source connection message comprises power source configuration information.

6. The connector of claim 5, wherein the data line, the power line, and the message transmission line are integrated into a connecting cable.

7. The connector of claim 5, wherein the second electronic device is a wearable augmented reality device or a wearable virtual reality device.

8. The connector of claim 1, further comprising:
   a second connector component coupled with the first end of the data line and configured to couple the data line with the second electronic device; and
   a third connector component coupled with the second end of the message transmission line and configured to couple the message transmission line to the first electronic device or the second electronic device.

9. The connector of claim 8, wherein the first connector component and the second connector component are of a same type.

10. The connector of claim 9, wherein each of the first connector component and the second connector component is any one of:
    a Universal Serial Bus Type-C connector component;
    a Universal Serial Bus Lighting connector component;
    a Universal Serial Bus Type-B connector component;
    a Universal Serial Bus Type-A connector component; and
    a Mini Universal Serial Bus component.

11. The connector of claim 1, wherein the first connector component is a universal serial interface component.

12. The connector of claim 1, wherein when the second end of the message transmission line is coupled with the second electronic device, the connector further comprises:
    a fourth connector component coupled with the first end of the data line and the second end of the message transmission line, and configured to couple the data line and the message transmission line to the second electronic device.

13. The connector of claim 1, wherein the data line, the power line, and the message transmission line are integrated into a connecting cable.

14. The connector of claim 13, wherein the connecting cable is formed as a branched connecting cable, the first connector component is located at a first end of the connecting cable, a second end of the connecting cable is configured to be coupled with the second electronic device, and the power-supplying connector component is located at a branch end of the connecting cable.

15. The connector of claim 14, further comprising a housing capable of accommodating the first electronic device, wherein the connecting cable is fixed on the housing, and the second connector component extends outward from the housing.

16. The connector of claim 13, wherein the power-supplying state detection circuit is arranged within the connecting cable.

17. The connector of claim 1, wherein the second electronic device is a wearable augmented reality device or a wearable virtual reality device.

18. A second electronic device, comprising a connector for coupling a first electronic device and the second electronic device with a power source to enable the power source to provide a current to the first electronic device and the second electronic device, wherein the first electronic device is able to communicatively be connected to the second electronic device via the connector and supply power to the second electronic device, and the connector comprises:
- a first connector component configured to be coupled with the first electronic device;
- a power-supplying connector component configured to be coupled with the power source;
- a power line configured to couple the second electronic device and the first connector component with the power-supplying connector component to supply power to the second electronic device and the first electronic device by the power source;
- a data line having a first end coupled with the second electronic device and a second end coupled with the first connector component for data transmission; and
- a power-supplying state detection circuit configured to be coupled with the power-supplying connector component and detect whether the power-supplying connector component is coupled with the power source; and
- a message transmission line having a first end coupled with the power-supplying state detection circuit,
- wherein a second end of the message transmission line is coupled with the second electronic device, and the power-supplying state detection circuit is configured to transmit a power source connection message to the second electronic device via the message transmission line when it is detected that the power-supplying connector component is coupled with the power source, to enable the second electronic device to transmit a power-supplying-stop message to the first electronic device, and the power-supplying-stop message is configured to inform the first electronic device to stop supplying power to the second electronic device; or
- the second end of the message transmission line is coupled with the first connector component, and the power-supplying state detection circuit is configured to transmit a power source connection message to the first electronic device via the message transmission line when it is detected that the power-supplying connector component is coupled with the power source, to inform the first electronic device to stop supplying power to the second electronic device,
- wherein the power source connection message is configured to indicate that the power-supplying connector component is coupled with the power source.

19. The second electronic device of claim 18, wherein the power-supplying state detection circuit is provided in the second electronic device.

20. The second electronic device of claim 18, wherein the second electronic device is a wearable augmented reality device or a wearable virtual reality device.

* * * * *